(12) United States Patent
Schleichert et al.

(10) Patent No.: US 9,180,760 B2
(45) Date of Patent: Nov. 10, 2015

(54) BUMPER BEAM WITH LOSING PLATE JOINED USING CD WELDING (CAPACITOR DISCHARGE)

(71) Applicants: Edward Schleichert, Sailauf (DE); Oliver Kostka, Sailauf (DE)

(72) Inventors: Edward Schleichert, Sailauf (DE); Oliver Kostka, Sailauf (DE)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/088,411

(22) Filed: Nov. 24, 2013

(65) Prior Publication Data
US 2014/0077522 A1    Mar. 20, 2014

(30) Foreign Application Priority Data

Sep. 3, 2012   (DE) .......................... 10 2012 215 595
Jan. 4, 2013   (DE) .......................... 10 2013 200 073

(51) Int. Cl.
  *B60R 19/02*   (2006.01)
  *B60J 5/04*    (2006.01)
  *B23K 11/26*   (2006.01)

(52) U.S. Cl.
  CPC .............. *B60J 5/0444* (2013.01); *B23K 11/26* (2013.01); *B60J 5/0461* (2013.01); *B60R 19/02* (2013.01); *B23K 2201/006* (2013.01); *Y10T 29/49622* (2015.01)

(58) Field of Classification Search
  CPC .......... B60R 19/02; B60R 19/04; B60R 19/18

USPC ................. 296/146.5, 146.6, 187.03, 187.09, 296/187.11, 187.12; 293/102; 29/897.2
See application file for complete search history.

(56) References Cited

U.S. PATENT DOCUMENTS

| | | | | |
|---|---|---|---|---|
| 5,056,861 | A  * | 10/1991 | Garnweidner et al. | .. 296/187.12 |
| 6,227,609 | B1 * | 5/2001  | Mellis  | ........................ 296/146.6 |
| 6,389,697 | B1 * | 5/2002  | Benoit et al. | ................. 29/897.2 |
| 6,554,345 | B2 * | 4/2003  | Jonsson | ..................... 296/146.6 |
| 6,591,577 | B2   | 7/2003  | Goto et al. | |
| 6,622,450 | B2 * | 9/2003  | Nees et al. | ..................... 296/202 |
| 6,663,169 | B2 * | 12/2003 | Gehringhoff et al. | .... 296/187.12 |
| 6,817,652 | B2 * | 11/2004 | Graber et al. | ............. 296/146.6 |
| 6,863,321 | B2 * | 3/2005  | Jonsson et al. | ................ 293/102 |
| 6,869,130 | B2 * | 3/2005  | Bodin et al. | ............... 296/146.6 |
| 7,086,686 | B2 * | 8/2006  | Bullmann et al. | ......... 296/146.6 |
| 7,316,446 | B2 * | 1/2008  | Wikstrom | ................... 296/146.6 |
| 7,347,486 | B2 * | 3/2008  | Uchida et al. | ............ 296/187.03 |
| 7,566,091 | B2 * | 7/2009  | Yagi | ............................ 296/146.6 |
| 7,637,555 | B2 * | 12/2009 | Kameoka | ................... 296/146.6 |
| 7,819,462 | B1 * | 10/2010 | Owens | ........................ 296/146.6 |
| 7,926,865 | B2   | 4/2011  | Terada et al. | |
| 8,061,762 | B2 * | 11/2011 | Arvidsson et al. | ......... 296/146.6 |
| 8,299,399 | B2 * | 10/2012 | Cornelius et al. | ............. 219/149 |
| 8,544,935 | B2 * | 10/2013 | Wille et al. | ................ 296/146.6 |

(Continued)

FOREIGN PATENT DOCUMENTS

DE        4133144 A1      4/1992
WO   WO 2009/016602   *   2/2009   ............ B23K 11/11

*Primary Examiner* — Gregory Blankenship
(74) *Attorney, Agent, or Firm* — Dickinson Wright PLLC

(57) ABSTRACT

The invention relates to a bumper bracket for a motor vehicle body, comprising a first profiled section having a three-dimensional structure and a second component, which spatially closes the first profiled section. The two components have overlapping surfaces used for welding, wherein the welding is carried out by way of impulse capacitor discharge welding.

7 Claims, 3 Drawing Sheets

(56) References Cited

U.S. PATENT DOCUMENTS

| | | | |
|---|---|---|---|
| 8,602,483 B2* | 12/2013 | Svedberg et al. | 296/146.6 |
| 2003/0222056 A1* | 12/2003 | Salzer et al. | 219/116 |
| 2004/0033732 A1* | 2/2004 | Koch, Jr. | 439/843 |
| 2008/0120844 A1* | 5/2008 | Yang et al. | 29/897.2 |
| 2010/0242284 A1* | 9/2010 | Danaj et al. | 29/897.2 |
| 2014/0062132 A1* | 3/2014 | Schleichert | 296/187.12 |
| 2014/0062133 A1* | 3/2014 | Schleichert et al. | 296/187.12 |
| 2014/0077522 A1* | 3/2014 | Schleichert et al. | 296/146.6 |

* cited by examiner

BUMPER BEAM WITH LOSING PLATE JOINED USING CD WELDING (CAPACITOR DISCHARGE)

CROSS REFERENCE TO RELATED APPLICATIONS

This U.S. Patent Application claims the benefit of DE Patent Application Serial No. 10 2013 200 073.1 filed Jan. 4, 2013, entitled "Bumper Bracket," which claims priority to DE Patent Application Serial No. 10 2012 215 595.3 filed Sep. 3, 2012, the entire disclosures of the applications being considered part of the disclosure of this application, and hereby incorporated by reference.

BACKGROUND OF THE INVENTION

1. Field of the Invention

The invention relates to a bumper bracket for a motor vehicle body, comprising a first profiled section having a three-dimensional structure and a second component that spatially closes the first profiled section.

2. Description of the Prior Art

Bumper brackets of the type in question are used in a motor vehicle body. Essential aspects for the bumper bracket according to the invention are for the bumper bracket to offer effective protection for the interior space of the motor vehicle body relative to the direction of an anticipated impact, which is essentially transverse to the longitudinal extension of the bumper bracket, and to allow connection to the associated structural component of the motor vehicle body.

In the spirit of lightweight construction in modern vehicle manufacturing, the bumper bracket not only absorbs the energy during use in the event of a crash, but also contributes to reinforcing the structure during the vehicle's operation. For this purpose, the bumper bracket is connected to the longitudinal beams of the vehicle structure in a flexurally and torsionally rigid manner. The geometry of the bracket is determined by rigidity requirements and by a high-energy absorption capacity at the lowest possible weight and acceptable manufacturing costs. The requirements in regard to the energy absorption capacity are determined by insurance, statutory and manufacturer-specific regulations.

It is already known to use a hollow profiled section made of steel or aluminum as a bumper bracket for a motor vehicle body, wherein starting from a pipe, the hollow profiled section is designed as a single-piece profiled steel section having high strength, robustness and deformation work, the end regions of the section being designed in a tab-like manner for attachment to the structural component, in particular in the motor vehicle door (DE 41 33 144 A1). The pipe can have a round, or oval, or also an elliptical cross-section. It is also possible for two pipes to be disposed next to each other relative to the direction of an anticipated impact. A bumper bracket for a motor vehicle body, comprising two profiled pipe sections disposed next to each other relative to the direction of any anticipated impact, has already been further developed from a manufacturing point of view such that both profiled pipe sections are integrally formed of steel strip that has been brought into the target cross-sectional form by way of a roll forming method, wherein the steel strip forming the profiled pipe sections is fixed at the connecting points by a longitudinal seam weld joint (U.S. Pat. No. 6,591,577 B2).

One known type of bumper bracket is shown in U.S. Pat. No. 7,926,865, which teaches a bumper bracket that has a mounting plate in a band-like shape and a hat-shaped mounting element. The two components of the bumper bracket are joined by upper and lower joint flanges and connected to the crash boxes. The type of the joint is not described in detail.

It is also known not to produce the profiled sections as closed pipes, but form them from sheet steel in the manner of a hat. Structures having a double hat form are also possible. The profiled sections are closed with a cover so as to create greater stability and rigidity.

SUMMARY OF THE INVENTION

The bumper bracket produced from steel strip for side impact protection, from which the invention proceeds, has flat sections at the ends for joining in the profiled component, with the one or both parallel hat profiles developing from these sections. These profiled sections have a symmetrical design and have a boundary surface extending along the longitudinal axis of the profiled section. The free longitudinal edges of the metal sheet and of the cover are disposed so as to overlap with each other and are joined by way of a longitudinal seam weld joint. In the prior art, the longitudinal seam weld joint is implemented as a laser weld seam, MAG weld seam, and in particular as a spot weld seam.

The problem underlying the teaching is that of configuring the known bumper bracket for a motor vehicle body, which is produced from a strip-shaped metal sheet in a forming process, and further developing it so that as uniform and continuous as possible a force absorption is assured and the production process is optimized.

The solution according to one aspect of the present invention is to employ an impulse capacitor discharge welding method to close the profiled section. Such impulse capacitor discharge welding methods have previously only been employed for smaller components.

Previously, the impulse capacitor discharge welding method could only be used conditionally, because the capacitor must be dimensionally increased for longer weld seams. A weld seam length measuring 500 mm to 1000 mm requires the use of a capacitor with one million ampere.

The method is also advantageous because no discoloration of the weld joint on the surface is apparent.

The bumper bracket is advantageously formed of two components, which have surfaces that are welded together.

In one advantageous embodiment, one of the components forms a cover on the other component.

However, it is also advantageous to provide both components with a three-dimensional structure.

One embodiment has a double hat structure for advantageous rigidity.

To produce an optimized joint, weld grooves are provided on at least one component.

It shall be regarded as advantageous that the lengths of the weld seams add up to a total length (L2), which corresponds to at least half the length of the profiled section (L1).

BRIEF DESCRIPTION OF THE DRAWINGS

Advantageous embodiments of the invention will be described in greater detail in the following figures and the description.

DESCRIPTION OF THE ENABLING EMBODIMENT

Figure 1:
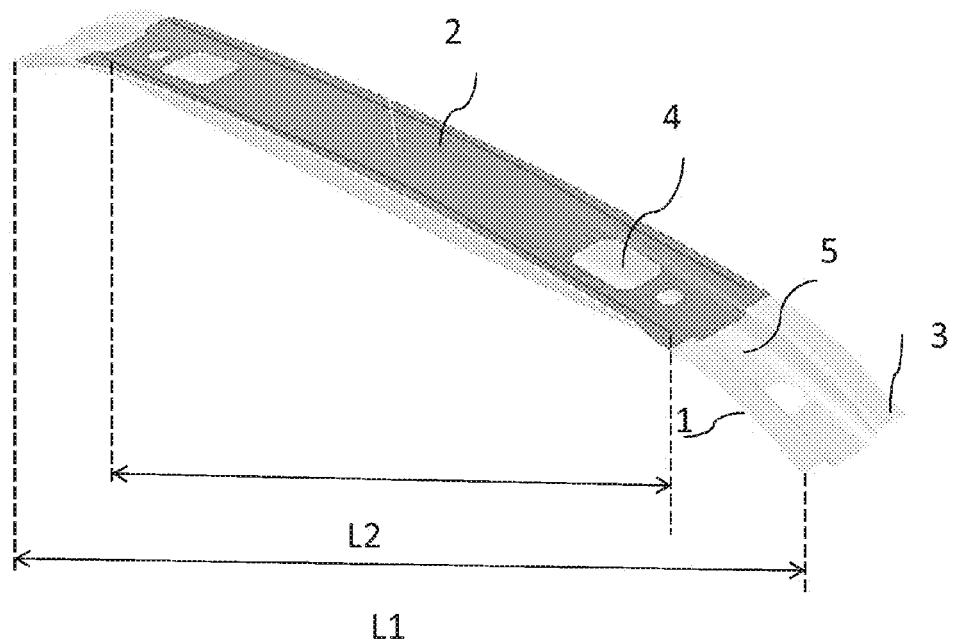
FIG. 1 shows a view onto an exemplary bumper bracket.

FIG. 1 shows an exemplary bumper bracket. A first profiled section 1 extends along the entire length L1 of the bumper bracket. On the right side of the drawing, it is visible that in the exemplary embodiment, the profiled section is flattened to form an end piece 3, which simplifies the installation.

The profiled section forms a U-shaped channel 5, which extends from the first end piece 3 to the second end piece. The profiled section 1 is covered by a second component 2 as a cover, which in this embodiment has cut-outs 4. The two components are joined to each other at the edges by way of weld seams, which extend continuously, or with minor interruptions, along the longitudinal axis of the profiled section and of the cover and together form a weld seam having a length L2, which represents more than ⅔ of the length L1 of the bumper bracket.

Figure 2:
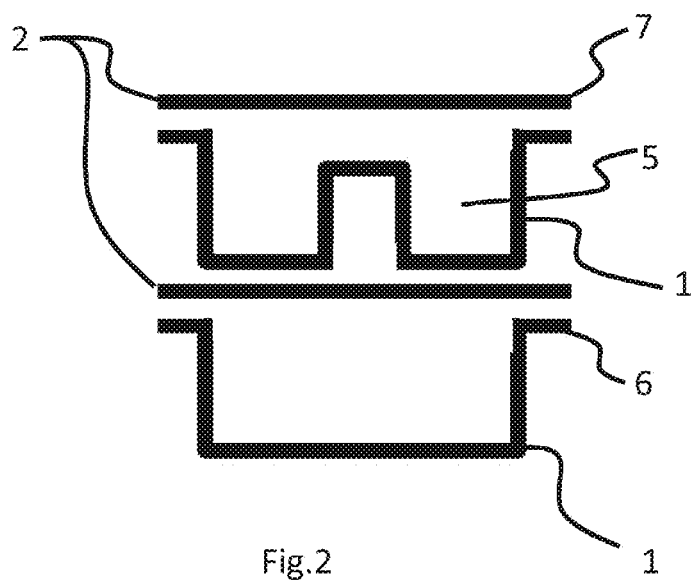
FIG. 2 shows sections through two embodiments.

FIG. 2 shows cross-sections through two examples, with the profiled section 1 having a single or double hat shape. The second component 2 is designed as a flat cover.

The profiled section 1 forms a first welding surface 6, which is located opposite a second welding surface 7 formed by the cover.

The solution according to one aspect of the present invention uses an impulse capacitor discharge welding method for closing the profiled section, with this method having previously only been employed for smaller components. The method is one variant of resistance welding for electrically conductive materials based on the Joule effect of an electric current flowing through the joining site.

This heats the joining partners until they melt. After the flow of current, a welded joint develops after the melt has re-solidified. Pressing together during and after the flow of current supports the formation of a close joint during resistance welding.

Impulse capacitor discharge welding, or CD welding, differs from conventional resistance welding.

The energy is delivered to the workpiece by charged capacitors. Advantages of this method include very high welding currents, a steep rate of current rise, a short welding time and thus, due to the concentration of energy, a smaller heat affected zone in the component. This also enables safe welding of high-strength steels. One of greatest advantages of this type of welding is that, due to the fast rate of current rise and the attendant fast transfer of heat into the weld geometry, the process temperature at the welding site is reached before the surrounding material can heat up.

Figure 3:
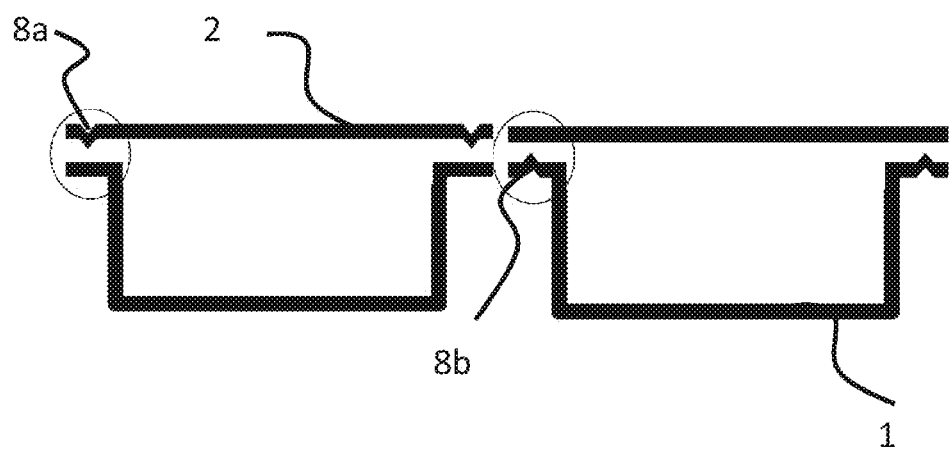
FIG. 3 shows an advantageous configuration of the bumper bracket.

Referring now to FIG. 3, to be able to optimally use the impulse capacitor discharge welding method, the bumper brackets are provided with a weld groove 8, which increases the contact of the two surfaces 6 and 7 and assures the position of the weld joint by guiding the current through-flow through the weld groove 8.

The weld grooves 8a, 8b are provided as shown in FIG. 3 either on the side of the cover 2 on the surface 7, or on the profiled section side on the first welding surface 6.

Figure 4:
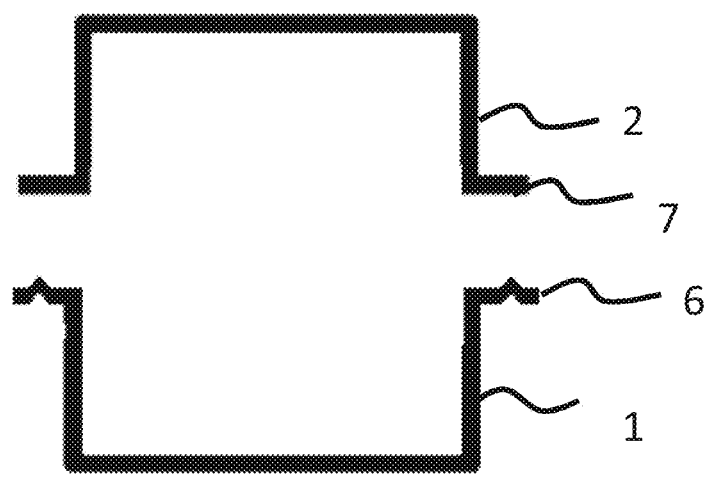
FIG. 4 shows another embodiment.

FIG. 4 shows one embodiment in which both components to be welded together are formed as three-dimensional components so as to create a bumper bracket having optimized properties.

The bumper brackets can be produced considerably more quickly and cost-effectively with the proposed impulse capacitor discharge welding method than with other known methods.

The invention claimed is:

1. A bumper bracket for a motor vehicle body, comprising:
   a first profiled section having a three-dimensional structure;
   a second component, the first profiled section and the second component having spaced apart and distinct overlapping surfaces used for welding, wherein the second component closes the first profiled section between the spaced apart overlapping surfaces, wherein the welding is carried out as impulse capacitor discharge welding; and
   wherein of at least one if the weld seams extends in a longitudinal direction at least half the length of the first profiled section.

2. The bumper bracket according to claim 1, wherein the second component is designed as a virtually flat cover.

3. The bumper bracket according to claim 1, wherein the second component likewise has a three-dimensional structure.

4. The bumper bracket according to claim 1, wherein at least one of the first profiled section and the second component has a double hat structure.

5. The bumper bracket according to claim 1, wherein the first profile section and the second component are made of steel as stampings and pressed parts.

6. The bumper bracket according to claim 1, wherein the overlapping surfaces include weld grooves.

7. A method for producing a bumper bracket for a motor vehicle body, the method comprising the steps of:
   preparing a first profiled section having a three-dimensional structure and a second component,
   positioning the second component to spatially close the first profiled section such that the first profiled section is spatially closed between spaced apart and distinct overlapping surfaces of the first profiled section and the second component, and
   impulse capacitor discharge welding the overlapping surfaces of the first profile section and the second component together to produce weld seams and wherein at least one of the weld seams extends in a longitudinal direction at least half the length of the profiled section.

\* \* \* \* \*